United States Patent
Chuah et al.

(10) Patent No.: US 7,330,699 B2
(45) Date of Patent: Feb. 12, 2008

(54) METHOD AND APPARATUS FOR PROVIDING MULTICAST SERVICES IN A WIRELESS COMMUNICATION ENVIRONMENT

(75) Inventors: Mooi Choo Chuah, Marlboro, NJ (US); Wei Luo, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 707 days.

(21) Appl. No.: 10/723,591

(22) Filed: Nov. 26, 2003

(65) Prior Publication Data

US 2005/0085254 A1 Apr. 21, 2005

Related U.S. Application Data

(60) Provisional application No. 60/509,342, filed on Oct. 7, 2003.

(51) Int. Cl.
*H04B 17/00* (2006.01)

(52) U.S. Cl. ............... 455/67.11; 455/522; 455/452.1; 455/3.01

(58) Field of Classification Search ............... 455/522, 455/69, 3.01, 446, 452.2, 454, 463, 500, 455/517, 68, 67.11, 452.1, 503, 67.16, 509; 370/331, 328, 318, 263, 390, 322
See application file for complete search history.

(56) References Cited

U.S. PATENT DOCUMENTS

| 6,353,596 B1 | 3/2002 | Grossglauser et al. | |
| 2002/0191562 A1* | 12/2002 | Kumaki et al. | 370/331 |
| 2003/0153346 A1* | 8/2003 | Kim et al. | 455/522 |
| 2004/0131026 A1* | 7/2004 | Kim et al. | 370/328 |

OTHER PUBLICATIONS

Session 3A, 3G Mobile Communications Technologies; http://conferences.ieee.org/3G2003/programme.htm, Jun. 26, 2003; MBMS service provision and its challenges; J. Ogunbekun & A. Mendjeli, Fujitsu Laboratories of Europe UK.
3GPP TSG RAN WG4, Jun. 14-16, Miami, FL; TSG R4#5 (99) 277; TS 25.101v1.2.0 (May 1999), 3rd Generation Partnership Project (3GPP) Technical Specification Group (TSG) RAN WG4 UE Radio transmission and Reception (FDD).
3GPP TR 23.846 1.1.0 (Jan. 2002); 3rd Generation Partnership Project: Technical Specification Group Services and System Aspects; Multimedia Broadcast/Multicast Service; Architecture and Functional Description (Release 6).
3GPP TSG RAN WG2 #29, Jun. 24-27, 2002; Turin, Italy, RS-021669; "Considerations on power allocation for MBMS".
3GPP TSG RAN WG2 #31, Aug. 18-23, 2002, Stockholm, Sweden, R2-022110; "MBMS Power Usage".
3GPP TSG RAN2 WG #33, Nov. 12-15, 2002, Sophia Antipolis, France, R3-023017; "Comparison of DSCH and FACH for MBMS".

* cited by examiner

*Primary Examiner*—Edward F. Urban
*Assistant Examiner*—John J. Lee (57) ABSTRACT

Method for multicasting messages to users of a wireless communication system includes the steps of establishing a power ratio threshold for transmitting the messages, measuring respective power ratios of the users, comparing the established power ratio threshold to the measured power ratios, determining a first subset of the users and a second subset of the users based upon the measured power ratios and delivering the messages to the first subset of the plurality of users via a first transmission scheme. The first transmission scheme delivers the messages to all of the users of the first subset via a broadcast channel. The method also has a step of delivering the messages to the second subset of the users via a second transmission scheme. The second transmission scheme delivers the messages to each of the users of the second subset via respective dedicated channels.

13 Claims, 6 Drawing Sheets

METHOD AND APPARATUS FOR PROVIDING MULTICAST SERVICES IN A WIRELESS COMMUNICATION ENVIRONMENT

CROSS-REFERENCE TO RELATED APPLICATIONS

This application claims benefit of U.S. provisional patent application Ser. No. 60/509,342, filed Oct. 7, 2003, which is herein incorporated by reference in its entirety.

FIELD OF INVENTION

The present invention relates to a wireless networks. More specifically, the present invention relates to the broadcasting of specific information to specific users in a wireless environment.

BACKGROUND OF INVENTION

Multicast communications for wireline users have been deployed in the Internet for at least the past 10 years. In such environments, a host joins a multicast group by informing a local multicast router that in turn contacts other multicast routers. A multicast tree is then created using typical multicast routing protocols. Along with the widespread deployment of wireless networks, the fast-improving capabilities of mobile devices, and an increasingly sophisticated mobile work force worldwide, content and service providers are increasingly interested in supporting multicast communications over wireless networks. Many new e-services can be made available if Multimedia Broadcast Multicast Services (MBMS) are available (e.g., distance education and entertainment services). In addition, important tactical information may be multicast to users (e.g., tanks, and planes) in emergency situations or battlefield environments. Supporting multicast features over wireless networks is an important and challenging goal, but several issues must be addressed before group applications can be deployed on a large scale over wireless networks.

In the interference-limited CDMA system, the downlink capacity is limited by the base station transmission power. The point to multipoint communication nature of MBMS requires higher base station transmission power than the unicast service for the similar application. There are two main issues that must be addressed in order to achieve the MBMS transmission efficiency: (1) lower target block error rate requirement than the unicast service for the same application, and (2) coverage over all MBMS group members. Specifically, because of intrinsic complexity associated with the multipoint-to-point feedback, the MBMS service has to be used in an unacknowledged mode. That is, no retransmission or ARQ is allowed to recover lost data blocks. The only available error control scheme is through channel coding. A channel without retransmission is much less tolerant to the block errors than a channel with retransmission. Therefore, the MBMS service must have a lower block error rate target than the unicast service for the same application. This translates into higher target signal-to-interference ratio (SIR) requirement and higher transmission power. Additionally, MBMS typically requires that all the MBMS group members in a cell can receive the service. Therefore, the required MBMS transmission power is determined based on the user who has the highest path loss to the base station. Statistically, maintaining reliable communication towards multiple users requires higher transmission power than towards a single user if the users are uniformly distributed within a cell. In addition, if power control is used, the transmission power has to be adapted to the user who suffers the highest instantaneous path loss to the base station.

Figure 1A:
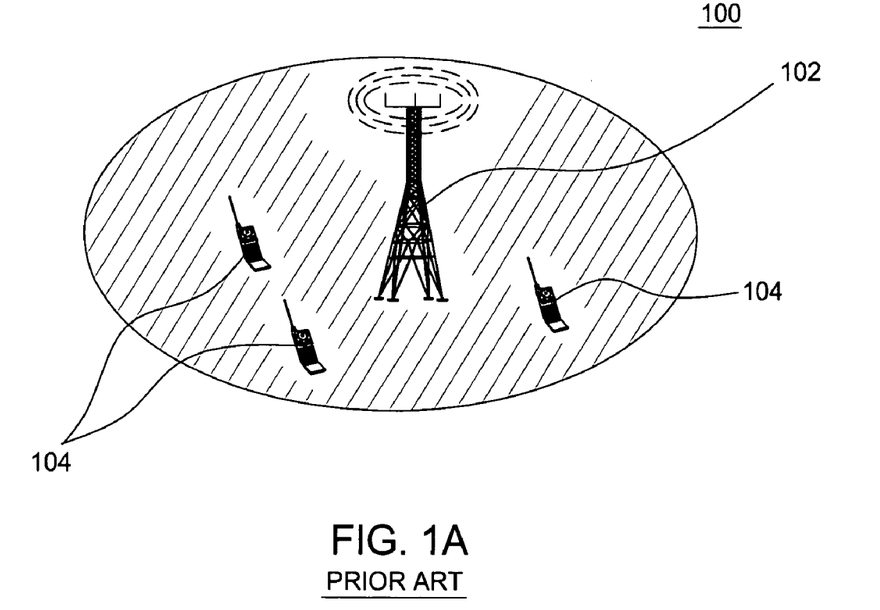
FIGS. 1(a) and 1(b) depict cellular communication sites and their corresponding power transmission schemes associated with the prior art.
Figure 1B:
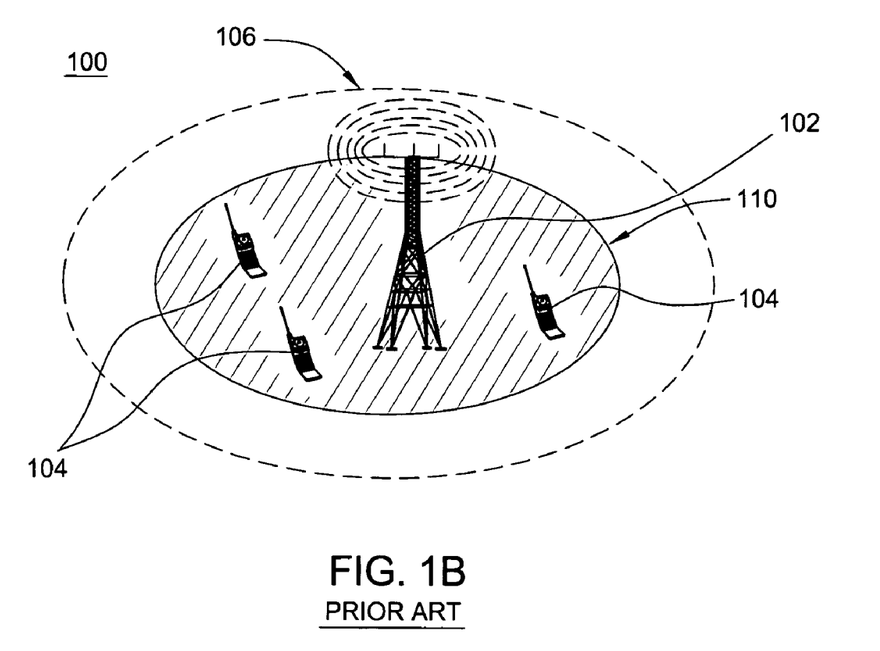

As an example, FIGS. 1(a) and 1(b) depict a typical cellular communication site 100 in accordance with the state of the art. Specifically, the cell site 100 is composed of a base station 102 that functions as an antenna for distributing radio frequency signals to one or more cellular communication devices 104 (i.e. cellular phone, wireless PDA, lap top and the like). Information transmitted from the base station 102 is received from a larger wireless communication network (not shown for sake of simplicity). In typical MBMS, sufficient power must be generated by the base station so that signals transmitted therefrom can reach all communication devices 104 up to a cell boundary 106. The amount of power necessary to transmit these messages is shown graphically as a shaded region 108 inside the cell boundary 106. More specifically and as can be seen by FIG. 1(a) sufficient power must be transmitted by the base station 102 to completely fill the entire region 108 defined by the cell boundary 106. This type of transmission scenario represents the highest and therefore the most inefficient use of power because it does not take into consideration the fact that one or more users may not necessarily be at the cell boundary but at some point radially inward therefrom.

One particular solution to increasing power transmission efficiency is to dynamically alter the power setting of the base station 102. This scenario is further seen in FIG. 1(b). Specifically, FIG. 1(b) depicts the cell site 100 including base station 102 and one or more users 104 that are not located at the cell boundary 106. By monitoring the path loss of users 104 within cell site 100, it is possible to dynamically change the output power of the base station to encompass a smaller area. Such smaller area is depicted by the shaded region 110 radially inwards of cell boundary 106. While such a scenario does result in a reduced power output of the base station 102 it does not take into consideration the fact that one or more users 104 may be better served by one type of transmission scheme while other users at different locations within the cell boundary may be served by a different transmission scheme such that overall power output of the system can be reduced even further than that contemplated in either of the schemes depicted by FIGS. 1(a) and 1(b).

SUMMARY OF THE INVENTION

The disadvantages heretofore associated with the prior art are overcome by a novel method for multicasting messages to a plurality of users that includes the steps of establishing a power ratio threshold for transmitting the messages, measuring respective power ratios of the users, comparing the established power ratio threshold to the measured power ratios, determining a first subset of the users (N−m) and a second subset of the users (m) based upon the measured power ratios and delivering the messages to the first subset of the plurality of users via a first transmission scheme. The first transmission scheme delivers the messages to all of the users of the first subset via a broadcast channel. Additionally, the method also has a step of delivering the messages to the second subset of the users via a second transmission scheme. The second transmission scheme delivers the messages to each of the users of the second subset via respective dedicated channels. The step of measuring respective power ratios of the users is performed either periodically or continuously. In one embodiment, the step of determining is performed by evaluating the following equation $$(N-m) = \arg\min_{m}\left(P_B(N-m) + \left(\sum_{i=1}^{m} P_i\right)\right) \quad \text{Equation 1}$$

where $P_B(k)$ is the required power of the broadcast channel to reliably provide MBMS service to user k, and Pi is the required power to support user i using a dedicated channel.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a wireless communication system and network for providing multicast broadcast services to a number of end users subscribing to the services. The power requirements necessary to provide the multicast information to each of the users in a given cell area is calculated in accordance with the number of users within the coverage area and their respective distances from a base station. Optimal power savings in transmitting the multicast service information is provided by assessing how many end users can receive the multicast information via a first transmission protocol and how many users can receive the multicast information via a second transmission protocol. Increased cost savings and reduced power requirements are achieved by virtue of the subject optimization.

Figure 2:
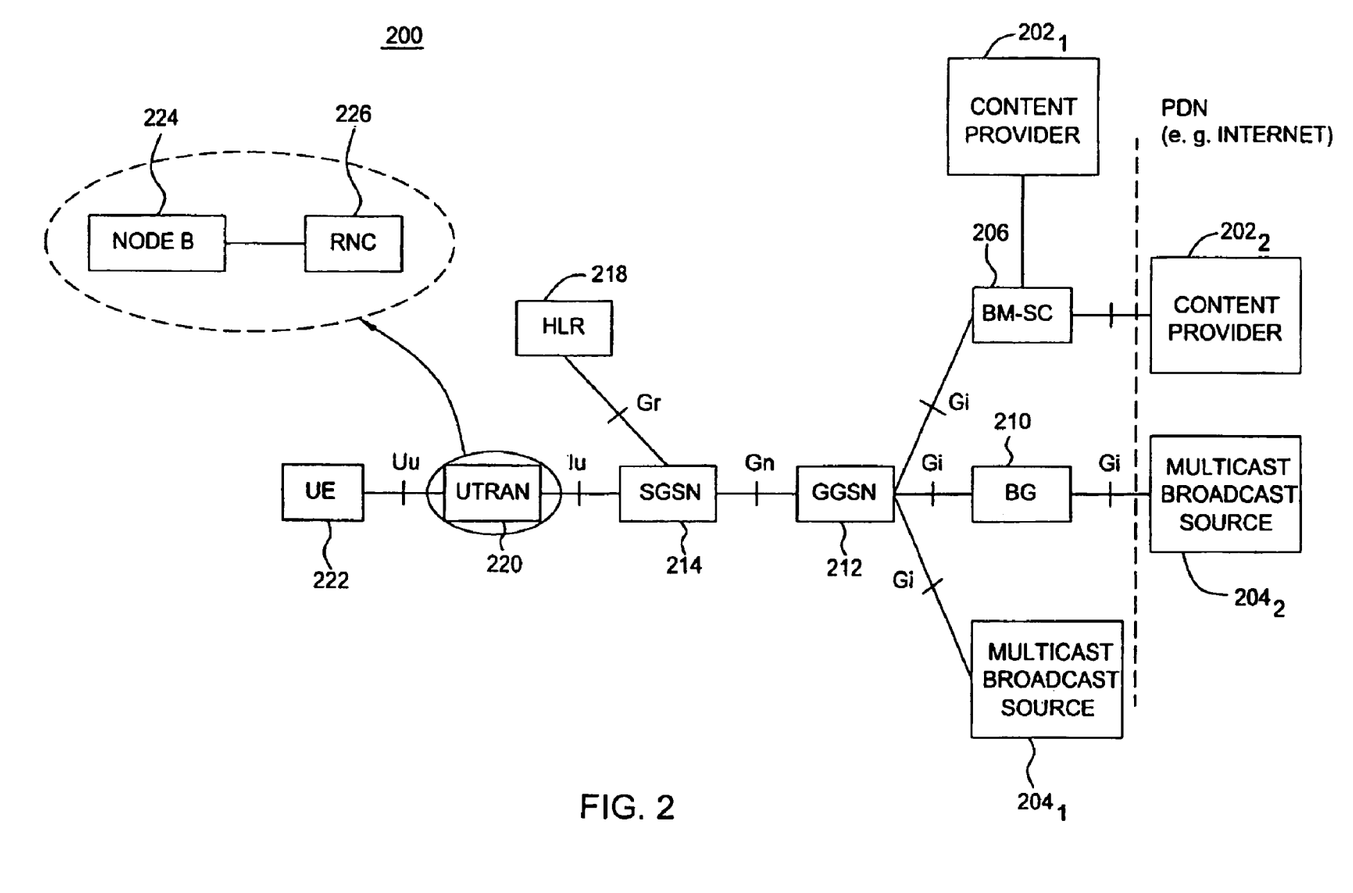
FIG. 2 depicts a block diagram of a wireless communication system in accordance with the subject invention.

FIG. 2 depicts a schematic diagram of a MBMS communication system 200 that is used for transmitting multicast information to one or more system subscribers. The system 200 comprises one or more content providers 202. In one example, the content provider 202 may be an internal provider $202_1$ or be located outside (i.e., as part of an outsource content provider on the internet or stored in a remote memory location $202_2$). The content provider 202 provides information such as stock prices, scores of sporting events and other dynamically changing information/events.

The system 200 also comprises one or more multicast broadcast sources 204. As described with respect to the content providers 202, multicast broadcast sources 204 may be either an integral component $204_1$ of the specific system 200 or outside the system (i.e., as part of the internet at a remote location $204_2$). The content providers 202 are connected to a broadcast/multicast service center (BMSC) 206. The BMSC is responsible for service provisioning and delivery, announcement, authentication and storage of service parameters. BMSC 206 is also able to accept content from external sources (e.g. such as external content provider $202_2$) and transmit this information as required.

A border gateway (BG) 210 is connected between the multicast broadcast source(s) 204 and a gateway GPRS support node (GGSN) 212. The BG 210 serves to connect the system 200 to components external thereto. The GGSN serves as an entry point for IP multicast traffic as MBMS data. The GGSN 212 is able to receive IP multicast traffic from all MBMS sources and route such traffic to the appropriate GPRS tunnels (GTP). A service gateway support node (SGSN) 214 is serially connected to the GGSN 212. The SGSN 214 performs a service control function for individual users in the system 200. The SGSN 214 also concentrates all individual users of the same MBMS service into a single MBMS service. The SGNS 214 also maintains a single connection with the source of the MBMS data. Connected to the SGSN 214 is a Home Location Register (HLR) 218. The HLR 218 is a database that resides in the network that contains service profiles and checks the identity of local subscribers of the multicast data.

Serially connected to the SGSN is one or more UTRAN elements 220. The UTRAN 220 (or base station) facilitates the interaction between information provided by the rest of the system and one or more end users (UEs) 222. Specifically, the UTRAN elements 220 deliver MBMS service over at least a broadcast or multicast service area. This is accomplished by establishing point to multipoint channels at an air interface without any required uplink radio frequency from an end user 222. The UTRAN 220 further comprises a node B element 224 and radio network controller (RNC) 226. The node B element 224 makes measurements and transmits specific signals for establishing broadcast protocols for various multicast end users 222 in the network 200. The RNC 226 provides a variety of functions including, but not limited to, deciding which end user 222 positioning method to use to transmit information to an end user; requesting measurements; calculating positions; providing assistance data; and generally controlling impact on the overall system 200. Conversely, the UEs 222 process messages from the UTRAN 220 to determine data channels for receiving multicast data information. The general functionality of system 200 for providing multicast broadcast services to end users is generally described U.S. Pat. No. 6,353,596 issued Mar. 5, 2002 to Grossglauser, et al. entitled, "System and method for multipoint-to-multipoint multicasting" herein incorporated in entirety by reference.

Figure 6:
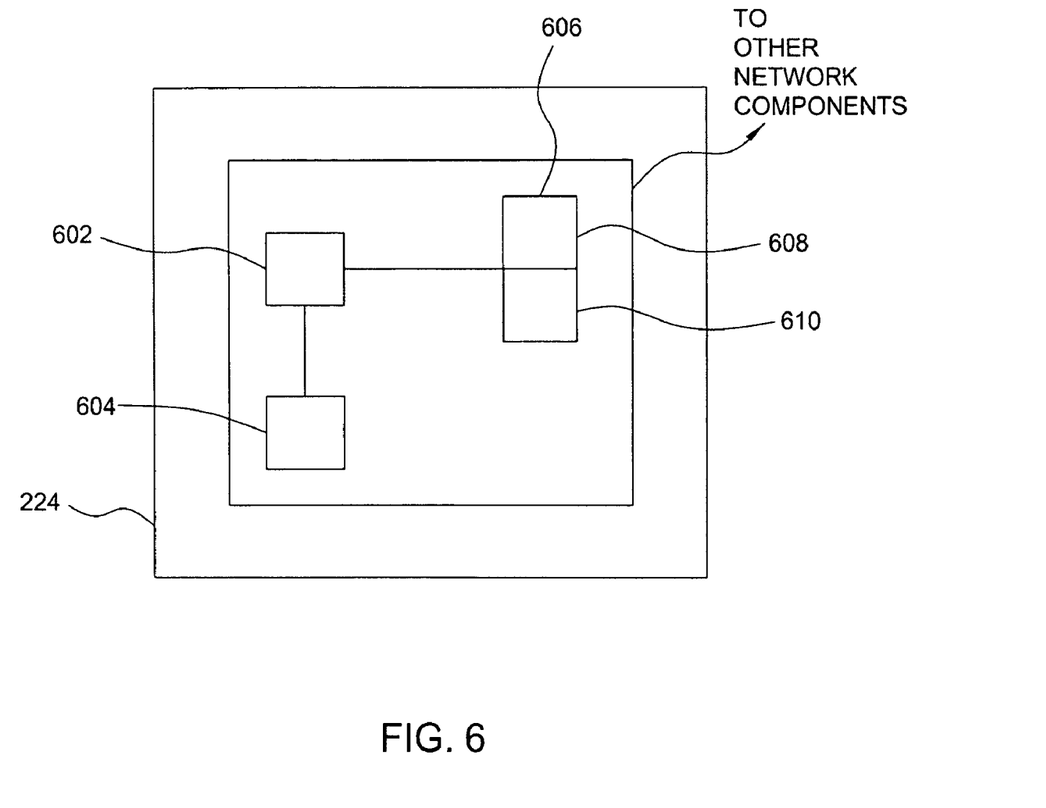
FIG. 6 depicts computer readable medium and devices related thereto for performing multicasting of messages in accordance with the subject invention.

FIG. 6 details a portion of the internal circuitry of an embodiment of the Node-B element 224. Specifically, the Node-B element 224 includes at least one central processing unit (CPU) 602, support circuits 604, and memory 606. The CPU 602 may comprise one or more conventionally available microprocessors. The support circuits 604 are well known circuits that comprise power supplies, clocks, input/output interface circuitry and the like. Memory 606 may comprise various types of computer readable medium including, but not limited to random access memory, read only memory, removable disk memory, flash memory and various combinations of these types of memory. The memory 606 is sometimes referred to as main memory and may in part be used as cache memory or buffer memory. The memory 606 stores various software packages 608-610 that perform operations essential to the system 200. When running a particular software package or program 608-610, the Node-B element 224 and system 200 in general becomes a special purpose machine for transmitting messages for multicasting in accordance with the subject invention as explained in greater detail below.

Figure 4:
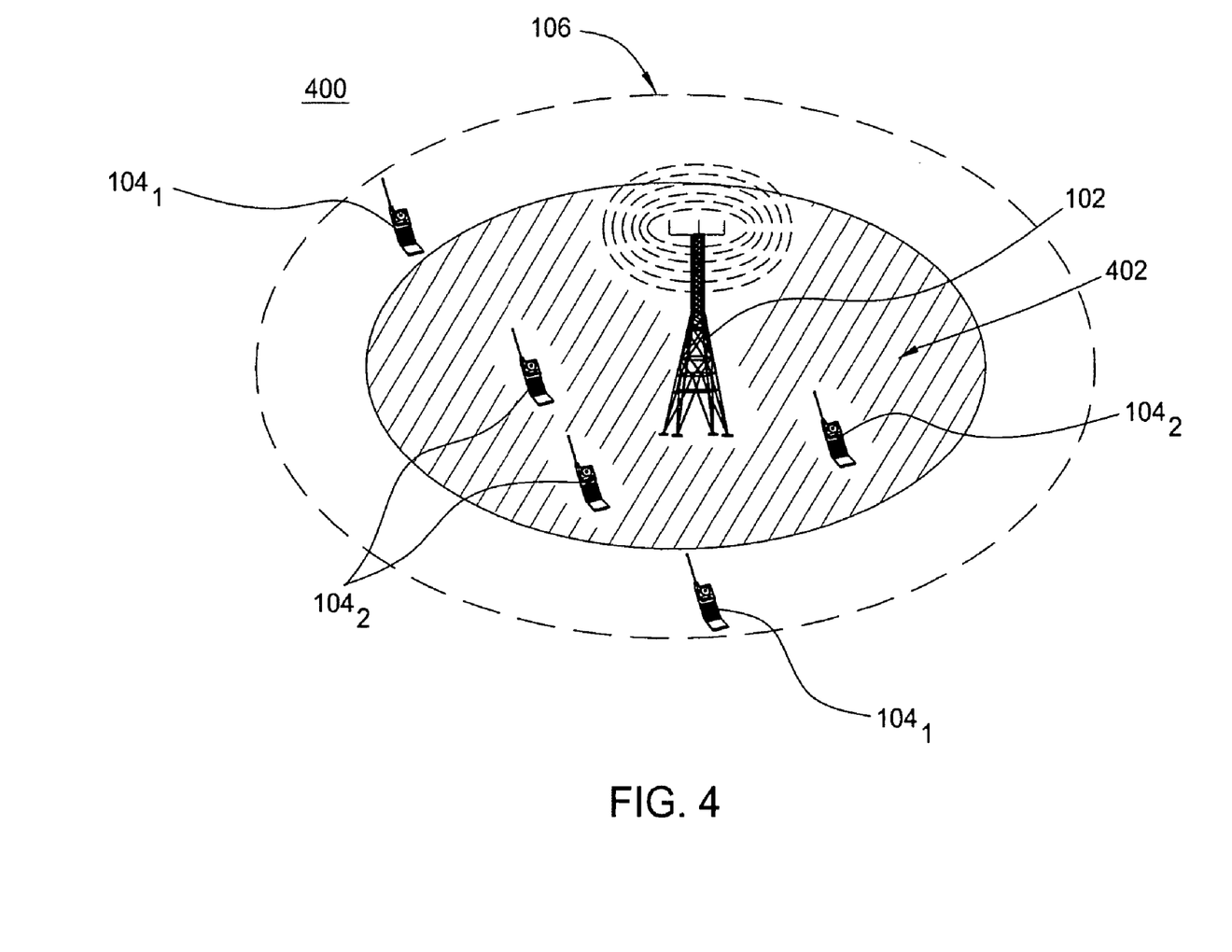
FIG. 4 depicts a cellular communication site and its corresponding power transmission scheme associated with the subject invention.

FIG. 4 depicts a cell coverage area 400 that includes a base station 102 which serves a cell coverage area 106 in accordance with the subject invention. The cell coverage area 106 contains one or more end users 104 that receive multicast broadcast services from system 200 via base station 102. Since the end users 104 are mobile units, one or more end users move about the coverage area 106. A broadcast threshold parameter Ec/Ior is represented by shaded region 402 of cell coverage area 106. The threshold is a ratio of pilot signal power (transmitted from a base station) received by an end user to the interference power and noise density seen by an end user within a cell coverage area of said base station. By way of example, the value Ec/Ior is identified as the threshold variable in which Ec is the received pilot power of an end user and Ior is the interference and noise density. That is, and for the purposes of the subject invention and method, one or more first users $104_1$ that are outside of the threshold region 402 of the cell coverage area 106 will have power requirements different than one or more second users $104_2$ that are closer to the base station 102.

Figure 3:
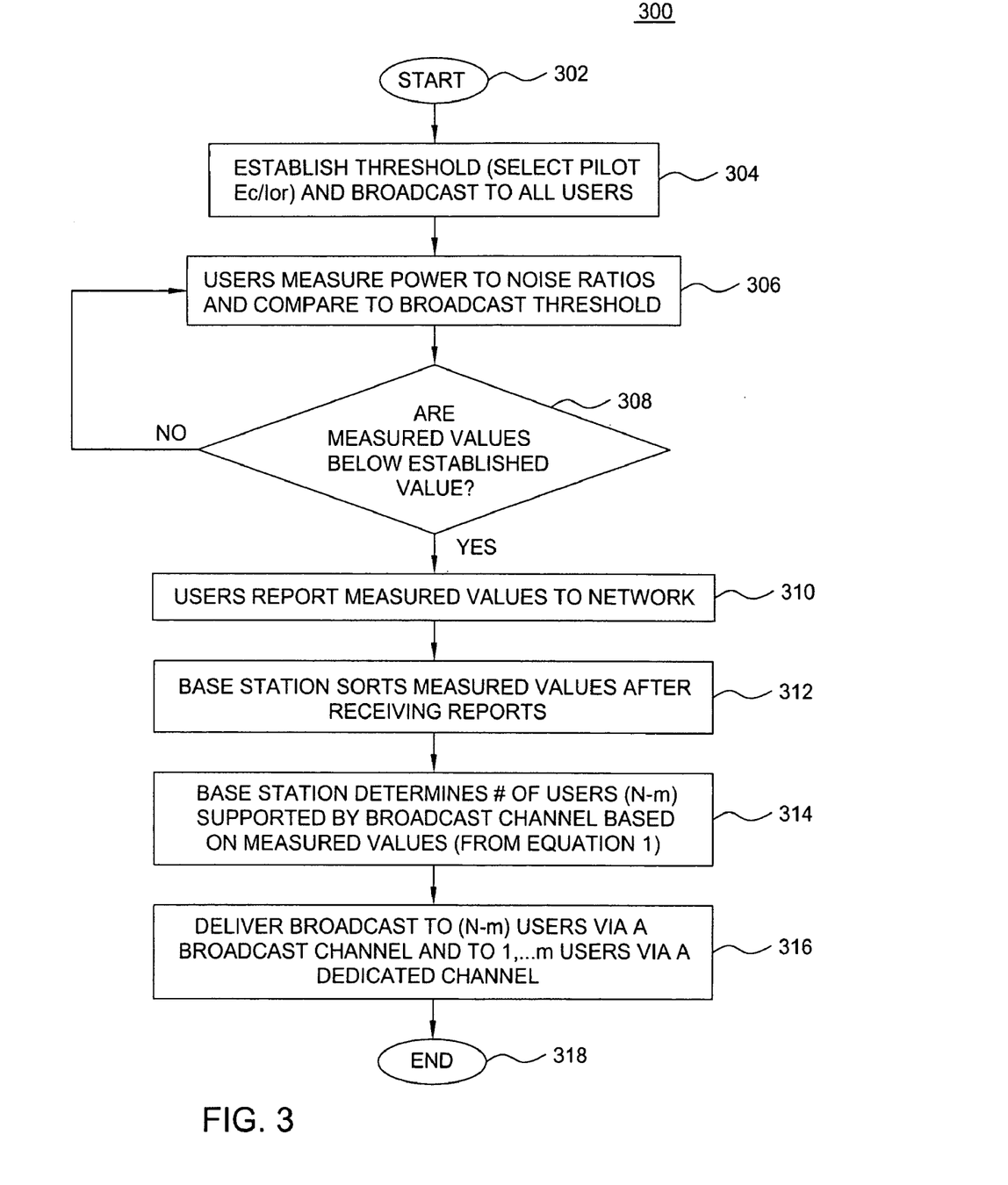
FIG. 3 depicts a series of method steps in accordance with a power allocation method for multicasting messages in the wireless communications system of the subject invention.

FIG. 3 depicts a series of method steps 300 in accordance with a method of the subject invention for delivering such multicast broadcast information in a highly efficient and power saving manner for various end users 104 of the cell coverage area 400 of FIG. 4. Specifically, the method starts at step 302 and proceeds to step 304 where the broadcast threshold for reliable broadcasting is determined. This is accomplished by selecting a pilot Ec/Ior value and broadcasting it to all multicast users with a given cell coverage area. The method proceeds to step 306 where a measurement of the power to noise ratios of each of the end users 104 are made. That is, each end user (such as UE 222 in FIG. 2) measures the received pilot signal power and interference and such measurements are compared to the broadcast threshold Ec/Ior.

At step 308, the method enters a decision step where it is determined if the measured values of the power to noise ratios are below the established broadcast threshold. If the measured values are not below the established broadcast threshold value, the method loops back to step 306 where measurements continue. In one embodiment of the subject invention, the measurements are made on a continuous basis. In other alternative embodiments, the measurements are made on a periodic basis. If the decision step 308 is answered positively, the method proceeds to step 310 where the measured values of the power to noise ratios are reported to the network (in one embodiment, the UEs 222 report the measured values to system 200 via Node-B element 224).

At step 312, after receiving reports, all of the measured values of the power to noise ratios are sorted (e.g., by the base station). In one example, the sorting is done in order of ascending Ec/Ior value. That is, the users 104 having the worse reception levels are ordered first on the list and the users having the best reception values are last on the list.

At step 314, a determination is made as to the number of users that will be supported by a first transmission scheme for multicasting services based on the measured values. For example, and in one embodiment of the subject invention, there are N end users 104 associated with a particular cell region 106. N−m users will receive the multicast information via a first transmission scheme while the remaining m users in the same cell coverage area 106 will be served by a second transmission scheme when receiving the multicast information. The determination is made by the base station according to a mathematical analysis of the average power consumption as detailed below. Once the determination of users N−m is made, the method proceeds to step 316 where the multicast information is delivered to the N−m users via the first transmission scheme and the multicast information is delivered to the remaining m users via a second transmission scheme). The method ends at step 318.

In one embodiment of the subject invention, the first transmission scheme is a broadcast channel where the multicast information is broadcast from the base station 102 to all users within the predefined threshold boundary 402. The second transmission scheme is a dedicated (or unicast) channel that is essentially a dedicated channel directed towards the one or more end users beyond the threshold boundary of 402. Each end user receiving the multicast information via this manner has its own dedicated channel associated thereto. The number of users N−m that will receive multicast information via the broadcast channel is dynamically calculated based on power consumption as follows:

$$(N-m) = \arg\min_m \left( P_B(N-m) + \left( \sum_{i=1}^{m} P_i \right) \right) \quad \text{Equation 1}$$

In the equation, $P_B(k)$ is the required power of the broadcast channel to reliably provide MBMS service (e.g. to provide the service at 1% frame error rate (FER)) to user k, and Pi is the required power to support user i using a dedicated channel. Both these power requirements are based on past Ec/Io measurement reports.

Figure 5:
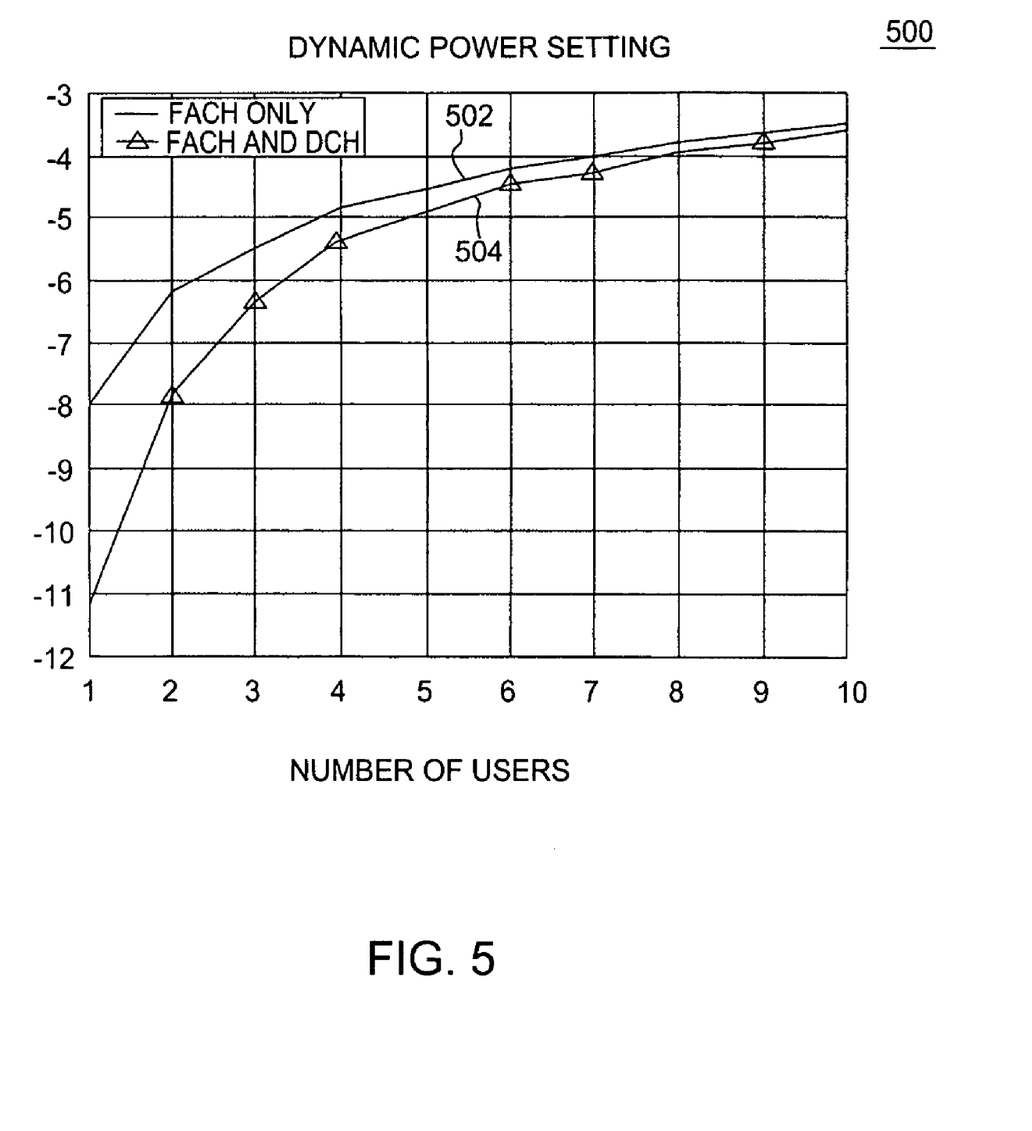
FIG. 5 depicts a graph of transmission power vs. transmission efficiency when operating a wireless communication system in accordance with the subject invention.

FIG. 5 depicts a graph 500 of the average required dynamic power setting (broadcast threshold) versus the number of users when using different transmission schemes including one associated with the subject invention. Specifically, one method of broadcasting information is via a Forward Access Channel (FACH) channel. Another type of accepted transmission scheme is using a dedicated channel (DCH) to provide multicast information to subscribers. However, each of these different transmission schemes has their own power requirements, the results of which are shown in FIG. 5. Particularly, curve 502 depicts the dynamic power setting that system 200 uses when transmitting information from the base station to users 104 using only a FACH channel transmission scheme. Curve 504 depicts a dynamic power setting provided by system 200 when a combination of FACH and DCH is used. As can be seen by inspection of the two curves, when comparing the first curve 502 with second curve 504 it is easily seen that the average required threshold for reliable broadcasting (Ec/Ior) is lower when using a combination of the two transmission schemes than rather the one scheme alone (and in this particular case when using only FACH alone). More particularly, when there are two users in a particular area the power savings is approximately 2 dB; three users, a cost savings of approximately 1 dB; four users, a cost savings of approximately ½ dB.

Accordingly, it is easily realized that in situations where a certain cell coverage area 106 has only a few multicast users, the dynamic allocation of resources (broadcast channel versus dedicated unicast channel) offers an effective solution for optimizing the power consumption in that particular cell coverage area 106.

Although various embodiments that incorporate the teachings of the present invention have been shown and described in detail herein, those skilled in the art can readily devise many other varied embodiments that still incorporate these teachings.

What is claimed is:

1. Method for multicasting a message to a plurality of users comprising:

establishing a power ratio threshold adapted to enable reliable transmission of said message;

comparing the established power ratio threshold to measured power ratios associated with said plurality of users;

determining a first subset of the plurality of users and a second subset of the plurality of users based upon the measured power ratios;

delivering said message to the first subset of the plurality of users via a first transmission scheme; and delivering said message to the second subset of the plurality of users via a second transmission scheme.

2. The method of claim 1, wherein:

said first transmission scheme delivering said message to said first user subset is via a broadcast channel.

3. The method of claim 1, wherein:

said second transmission scheme delivering said message to said second user subset is via respective dedicated channels.

4. The method of claim 1, further comprising:

periodically measuring the respective power ratios of said plurality of users.

5. The method of claim 1, further comprising:

continuously measuring the respective power ratios of said plurality of users.

6. The method of claim 1, wherein the step of determining is performed by evaluating an equation of the following form:

$$(N-m) = \arg\min_{m}\left(P_B(N-m) + \left(\sum_{i=1}^{m} P_i\right)\right)$$

where N is the plurality of users in a given area, N−m is the first subset of the plurality of users, m is the second subset of the plurality of users, $P_B(k)$ is a reliable MBMS broadcast service power level to user k, and Pi is the required power to support user i using a dedicated channel.

7. The method of claim 1, wherein the first subset of users has power requirements different from the second subset of users.

8. A computer readable medium having stored thereon a program which, when executed, performs a method of multicasting a message to a plurality of users comprising:

establishing a power ratio threshold adapted to enable reliable transmission of said message;

comparing the established power ratio threshold to measured power ratios associated with said plurality of users;

determining a first subset of the plurality of users and a second subset of the plurality of users based upon the measured power ratios;

delivering said message to the first subset of the plurality of users via a first transmission scheme; and delivering said message to the second subset of the plurality of users via a second transmission scheme.

9. The method of claim 8, wherein: said first transmission scheme delivering said message to said first user subset is via a broadcast channel.

10. The method of claim 8, wherein:

said second transmission scheme delivering said message to said second user subset is via respective dedicated channels.

11. The method of claim 8, further comprising:

periodically measuring the respective power ratios of said plurality of users.

12. The method of claim 8 further comprising:

continuously measuring the respective power ratios of said plurality of users.

13. The method of claim 8 wherein the step of determining is performed by evaluating an equation of the following form:

$$(N-m) = \arg\min_{m}\left(P_B(N-m) + \left(\sum_{i=1}^{m} P_i\right)\right)$$

where N is the plurality of users in a given area, N−m is the first subset of the plurality of users, m is the second subset of the plurality of users, $P_B(k)$ is a reliable MBMS broadcast service power level to user k, and Pi is the required power to support user i using a dedicated channel.

* * * * *